H. ENGLAND.
FISH HOOK.
APPLICATION FILED JUNE 14, 1915.
1,208,936.
Patented Dec. 19, 1916.
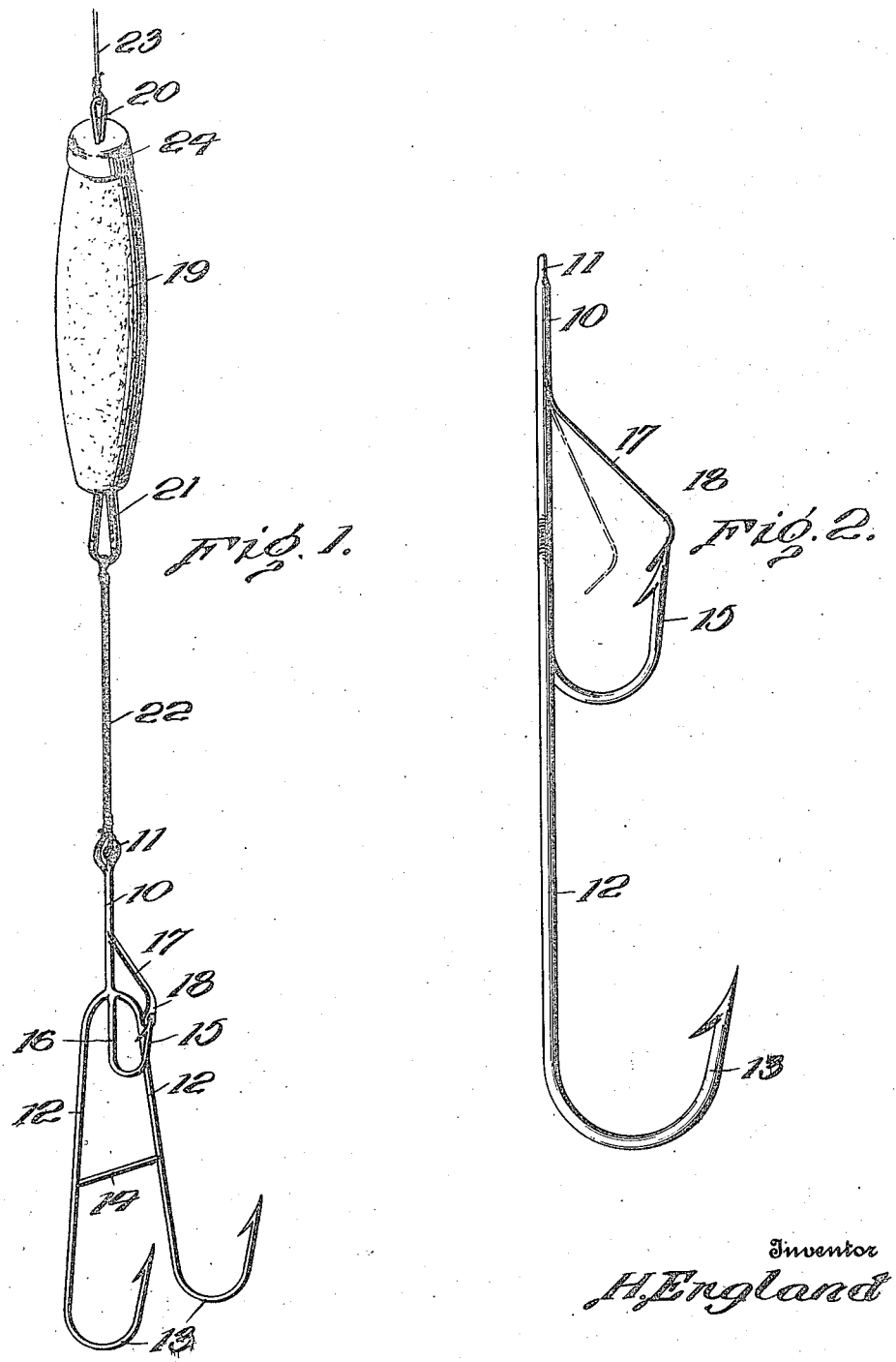
Inventor
H. England

UNITED STATES PATENT OFFICE.

HENRY ENGLAND, OF CHICAGO, ILLINOIS.

FISH-HOOK.

1,208,936.  Specification of Letters Patent.  Patented Dec. 19, 1916.

Application filed June 14, 1915. Serial No. 33,963.

*To all whom it may concern:*

Be it known that I, HENRY ENGLAND, a citizen of the United States, residing at Chicago, in the county of Cook and State of Illinois, have invented certain new and useful Improvements in Fish-Hooks, of which the following is a specification.

This invention contemplates an improved fishing hook and has as its primary object to provide a device of this character so constructed that, in use, when upward pull is exerted upon the hook, it will not become fouled with weeds.

The invention has as a further object to provide a device of this character having spaced primary hooks and a secondary bait hook supported in spaced relation to the primary hooks and in such position relative thereto, that a fish in attempting to reach the bait hook will, under ordinary circumstances, move into a position to be easily engaged by the primary hooks.

A still further object of the invention is to provide a device of this character which will be integrally formed and wherein the bait hook will be provided with a yieldable guard adapted to prevent accidental displacement of the bait therefrom and to also prevent the weeds from fouling the bait hook.

The invention has as a still further object to provide an improved float for the hook which will be counterbalanced to support the hook in depending position in the water.

Other and incidental objects will appear as the description proceeds and in the drawings wherein I have illustrated the preferred embodiment of the invention and wherein similar reference characters designate corresponding parts throughout the several views.

Figure 1 is a perspective view of my improved hook with the float attached thereto, and Fig. 2 is a side elevation of the hook on an enlarged scale with the float detached.

In the preferred embodiment of the invention, my improved hook includes a shank 10, which at its outer extremity, is formed with an eye 11. The inner extremity of the shank is bifurcated to form outwardly diverging arms 12 which are disposed in a common plane and form the shanks of terminally barbed hooks 13 which curve laterally from the shanks. Connecting the arms 12 at points substantially midway the ends thereof, is a bracing web or cross-piece 14 adapted to rigidly support the hooks 13 in spaced relation.

Arranged midway between the arms 12 at the inner extremities thereof is a barbed hook 15 having a shank 16 extending longitudinally from the inner extremity of the shank 10 and connected therewith at the juncture of the arm 12 with the said last mentioned shank. The shank 16 is disposed in a plane with the arms 12 while the hook 15 curves therefrom laterally and upwardly in a direction with the hooks 13.

The hook, as thus described, is preferably integrally formed and may be constructed of any suitable material. The hooks 13 provide primary hooks adapted to catch and hold a fish in the practical use of the device, while the hook 15 provides a secondary or bait hook which is normally supported above and in spaced relation to the primary hooks.

Secured at one extremity to the shank, is a yieldable guard 17 which may be formed of any suitable material and which, at its outer free extremity, is provided with a terminal eye 18 normally adapted to receive the free end of the barb of the hook 15 as best illustrated in Fig. 2 of the drawings. As shown in this figure, the guard 17 may be depressed so that bait may be readily positioned upon the hook 15, while in the normal position of the guard, it will prevent the accidental displacement of the bait from the hook. It will be noted that the guard slopes downwardly from the shank 10 toward the free extremity of the hook 15 and is arranged to overlie the point of the barb of the hook. Consequently, in the practical use of the device, when the hook is pulled upwardly, the guard 17 will tend to deflect weeds upon each side of the hook and prevent the fouling of the bait hook as well as the fouling of the primary hooks 13.

It is further to be observed that the inner extremities of the arms 12, which extend laterally in opposite directions from the shank 16 of the hook 15, will provide guards upon opposite sides of the said hook adapted to prevent a live bait engaged with the hook 15 from turning about the shank thereof so that even though the bait would be permitted to move its body, when placed within the water, still, the said bait would, at all times, be held in such position relative to the hooks 13 of the device that a fish endeavoring to reach the bait could be easily caught.

In connection with my improved hook, I preferably employ an elongated substantially cylindrical float 19 which may be formed of cork or any other suitable material. Extending axially of the float is a rod which, at one extremity, is provided with an eye 20 and at its opposite extremity, with a snap hook 21. Connecting the hook with the float 19, is a gut 22 which, at one extremity is secured to the eye 11 of the hook and at its opposite extremity is provided with a terminal ring or loop detachably engaging the hook 21. It is to be noted that in providing the snap hook 21, the gut 22 may be readily attached to or detached therefrom, while the said snap hook is of such nature that under ordinary circumstances, it will not foul with weeds in the practical use of the device.

The eye 20, as will be readily understood, is adapted to receive a line conventionally illustrated at 23 by which the device may be operated and for counterbalancing the float 19, when resting upon the surface of the water, I provide a weighted cap 24 which is fitted over the outer extremity of the float. Owing to the presence of the cap 24, the float 19 will be caused to lie longwise upon the surface of the water with the fish hook depending therefrom.

It will now be noted that the bait hook 15 is so arranged that a fish in attempting to reach the bait carried by the said hook will, under ordinary circumstances, move into such relation to the primary hooks 13 that by pulling upon the line 23, the said primary hooks may be caused to catch the fish. It will therefore be seen that I provide a very simple and efficient construction for the purpose set forth and while I have indicated the type of float preferably used in connection with my improved hook, still, it will be seen that any other conventional form of float may be employed, when desired, with equally good results.

As will be readily understood, a live frog may be engaged with the hook 15 to provide a bait and the escape of the frog will be prevented by the guard 17. However, in this connection, it may be stated that my improved hook may be used in catching frogs in which instance, some other suitable bait will be arranged upon the hook 15.

Having thus described my invention, what I claim and desire to secure by Letters Patent is:—

A fish hook including a shank having outwardly diverging arms formed integral therewith and curved laterally at their fixed extremities in opposite directions away from the shank, said arms at their free extremities being bent laterally to provide primary hooks, a transverse bar rigidly secured to the arms at a point intermediate their ends and serving to hold said arms permanently in fixed spaced relation to each other, a bait hook having a shank extending longitudinally from the first mentioned shank between the laterally curved portions of the arms and terminating short of the transverse bar, the bill of said bait hook being extended in the same direction as the bills of the primary hooks and spaced from the point of junction of the arms with the shank, and a guard secured to the first mentioned shank beyond its point of attachment with the arms and having its free end bearing against the bill of the bait hook, the shank and bill of said bait hook being disposed entirely at one side of the point of junction of the arms with the first mentioned shank.

In testimony whereof I affix my signature.

HENRY ENGLAND. [L. S.]